Dec. 2, 1958   P. AUDEMAR   2,862,360
HYDRAULIC CONTROL OF AN ELASTIC LOAD
Filed May 23, 1955   2 Sheets-Sheet 1
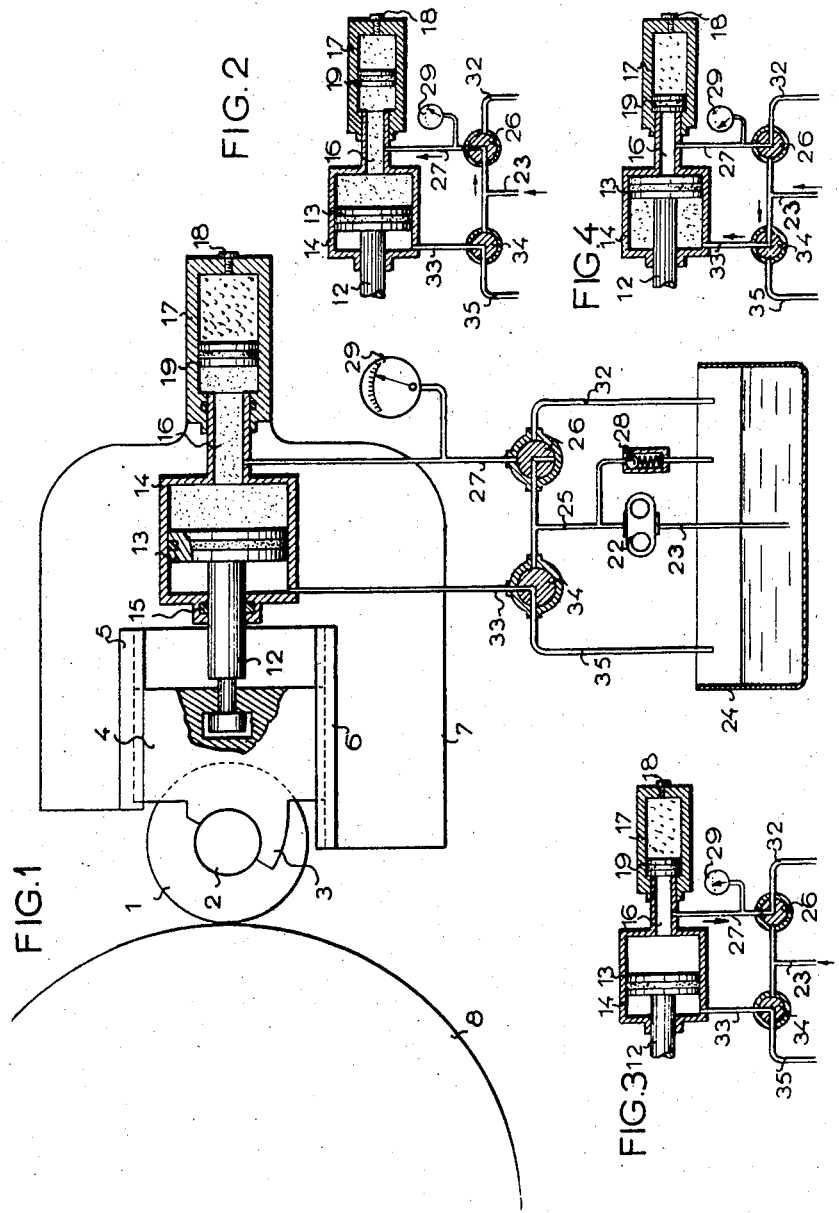
Inventor
P. Audemar
By Glascock Downing Seebold
Attys.

United States Patent Office 2,862,360
Patented Dec. 2, 1958

2,862,360

HYDRAULIC CONTROL OF AN ELASTIC LOAD

Pierre Audemar, Mulhouse, Haut-Rhin, France, assignor to Societe Alsacienne de Constructions Mecaniques, Mulhouse, Haut-Rhin, France, a company of France Application May 23, 1955, Serial No. 510,338

Claims priority, application France May 31, 1954

1 Claim. (Cl. 60—51)

This invention relates to a hydraulic control for varying the loading action of elastic means on a movable member. It finds a particularly important application in calenders, fabric printing machines or the like, wherein rollers are subjected to elastic loads often reaching enormous values e. g. comprised between 4 and 8 tons.

It has been proposed previously to use, for controlling the elastic load of such rollers, mechanical devices comprising control screws. This, however, gives rise to difficulties since with the above mentioned huge pressures, the said devices necessarily include strength-demultiplying means of a high ratio, so that their operation is extremely slow.

Other controlling devices have been also proposed, wherein a metal diaphragm fast with the structure supporting the printing cylinder is directly subjected to the action of a pressure liquid. Such an arrangement also offers certain drawbacks due to the enormous stresses to which the said diaphragm is thus subjected and also due to the fact that a liquid is incompressible for all practical purposes, which excludes any mobility or flexibility in the operation of the elastically loaded movable member.

The invention has for its purpose to provide a device for controlling the action of elastic means offering none of the drawbacks of the mechanical or hydraulic devices mentioned above, while being adapted to be used in a wide scope of application.

The main object of the invention is, therefore, to provide a hydraulic control device essentially constituted by a mass or column of liquid interposed anywhere in the mechanical connection including the elastic means to be controlled and extending between a fixed bearing point and the movable member, and means to vary the length of the said mass of liquid to thereby adjust the strength of said elastic means. With this arrangement, it is possible, for example, to bring rapidly an adjustable roller into contact with a fixed one, and then to adjust the pressure of contact between both rollers.

In a particular embodiment, the variation of length of the liquid mass is merely obtained by feeding liquid into a deformable capacity containing the said mass or conversely by evacuating liquid therefrom.

It is particularly convenient to interpose the liquid mass directly between the elastic means and the movable member to be loaded thereby.

Suitable abutment means are preferably provided to limit the active stroke of the elastic means.

The hydraulic control device according to the invention is particularly adapted to be used for elastic means constituted by a pneumatic cushion consisting of a mass of compressed gas contained within a suitable enclosure.

A more particular object of the invention is to provide a control device according to the invention, wherein the mass of pressure liquid is contained in a cylinder structure between two pistons of different diameters, the larger one of said pistons being fast with the elastically-loaded movable member.

The above described hydraulic control device permits, interalia, a rapid withdrawal of the loaded member which is extremely important when the action of the elastic means is to be interrupted for a certain time e. g. when a worn-out roller is to be renewed. This system, however, is sometimes insufficiently supple, in particular, when the action of the elastic means is to be suppressed but for a limited time, to be subsequently re-established with its prior intensity. This is the case, for example, in a calender when the pressure of a movable roller is to be suppressed for a short time to accommodate a seam, or the like, in the fabric to be treated, the said pressure being to be re-established with its initial value, immediately after the passage of the said seam.

It is therefore another object of the invention to house the above-mentioned liquid mass in an enclosure, the configuration of which may be temporarily so modified as to reduce the active length of the said mass without varying its volume, the said elastic means being locked simultaneously with the shortening of the active length of the liquid mass, so that the said shortening only affects the end of the mechanical connection directly acting upon the movable member.

A more specific object of the invention is to permit the above mentioned modification of the configuration of the liquid mass by providing an additional cylinder in which a free piston is slidably mounted, the required deformation being obtained by an automatic withdrawal of the said piston, while the required locking of the elastic means is ensured by a valve automatically closed upon said withdrawal and adapted to interpose a partition in the liquid mass so that the elastic means are positively prevented from transmitting their action beyond the said partition.

Other objects and advantages of the invention will be apparent from the following detailed description, together with the accompanying drawing, submitted for purposes of illustration only and not intended to define the scope of the invention, reference being had for that purpose to the subjoined claim.

In these drawings:

Fig. 1 is a diagrammatical elevational partly sectional view with parts broken away of a loading mechanism equipped with a hydraulic control device according to the invention, shown in operative position;

Fig. 2 is a reduced view of a part of the said mechanism, shown during an increase of the loading pressure;

Fig. 3 is a view corresponding to Fig. 2, but during a decrease of the said pressure.

Fig. 4 shows the same mechanism during a withdrawal of the loaded movable member.

Figure 5:
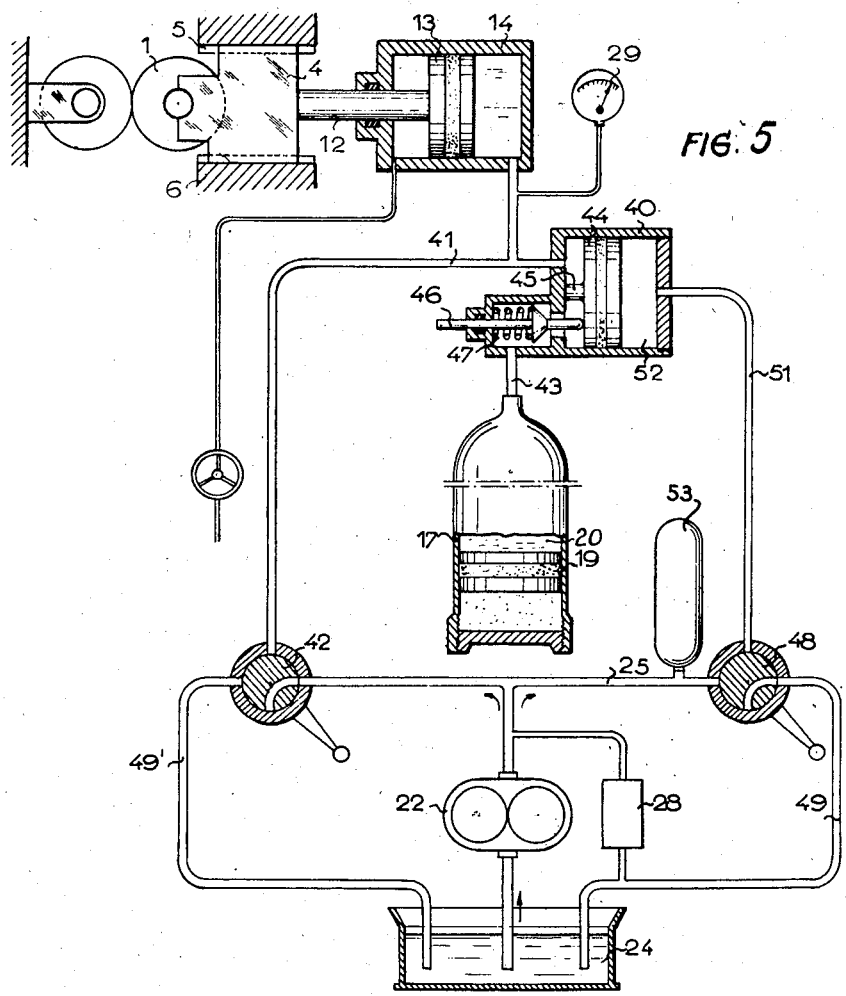
Fig. 5 is a diagrammatical partly sectional view of another embodiment of the invention.

Referring first to Fig. 1, there is shown at 1 a movable roller e. g. of a fabric printing machine, carried at each end by a journal 2 mounted in a bearing 3 integral with a slide 4. The slide 4 cooperates with sliding bars 5 and 6 orthogonal to the axis of the roller 1 and secured to a frame 7, so that when the slide 4 is moved in the sliding bars 5 and 6 towards the left (in the drawing), the printing roller 1 is pressed upon a bearing roll 8 according to a conventional well-known arrangement. The printing roller 1 is an illustration of a movable member loaded by elastic means, as described in the preamble. The slide 4 is actuated by a rod 12 integral with a piston 13 slidably mounted in a cylinder 14 also secured on the frame 7. The cylinder 14 is provided at one end with a packing gland 15 while its other end communicates through a passage 16 with another cylinder 17 of smaller diameter than the cylinder 14. The other end of the cylinder 17 is provided with a filling hole, normally closed by a plug 18, which permits introducing a compressed gas into the cylinder 17. The latter contains a free piston 19; the space including the passage 16, a portion of the cylinder 14 and a portion of the cylinder 17, between the two pistons 13 and 19 constitutes a tight capacity space, for containing a mass of liquid according to the invention, hereinafter called "the active mass of liquid."

The said space communicates with a source of pressure liquid constituted, in the example shown, by a pump 22 capable of sucking through a duct 23 liquid such as oil from a tank 24 and also capable of feeding this liquid under pressure into the passage 16 through ducts 25 and 27 under the control of a cock 26 interposed between said ducts. An unloading valve 28 mounted on the duct 25 of the pump 22 returns the excess of liquid into the tank 24. A pressure-indicator 29 mounted on the duct 27 is used for indicating the pressure in the above-mentioned space formed between the pistons 13 and 19 and, hence, the pressure of contact between the roller 1 and the roll 8, the said pressure of contact being generated by the pneumatic cushion contained in the closed end of the cylinder 17.

The cock 26 is a three-way cock adapted to selectively establish a communication between the duct 27 and either the outlet duct 25 of the pump or a duct 32 provided to return liquid into the tank 24. In its third position, the three-way cock 26 shuts off all three ducts 25, 27 and 32.

The left-hand compartment of the cylinder 14 is adapted to be connected through a duct 33 and a second three-way cock 34, either with the outlet duct 25 of the pump or with a discharge duct 35 leading to the tank 24. In its third position, the cock 34 shuts off all three ducts 33, 35 and 25.

This system operates as follows:

Assuming first that all parts are in the position shown in Fig. 1, i. e. in an operative position, corresponding to a well-defined pressure of contact between the roller 1 and the roll 8, the space formed between the two pistons 13 and 19 is filled with liquid entrapped in said space, since the duct 27 is closed by the cock 26. The roller 1 is in contact with the roll 8 and the above-mentioned active mass of liquid bears at one end on the piston 13, so that its other end holds the piston 19 stationary against the action of the pressure exerted by the compressed gas in the cylinder 17 and which urges the said piston 19 towards the left (in the drawing). Since the said active mass of liquid is incompressible for all practical purposes, the roller 1 is pressed resiliently on the roll 8 with a force equal to that exerted by the compressed gas on the piston 19 multiplied by the ratio of the area of piston 13 to that of piston 19. It will be easily understood that it is thus possible to exert considerable pressures of contact with a high degree of flexibility, since the minute irregularities of the contact surface between the roller 1 and the roll 8 is resiliently absorbed by a corresponding displacement of the piston 19 without any substantial variation of the pressure of contact.

A mere reading of the pressure-indicator 29 permits directly observing the variations of the said pressure of contact.

If the said contact pressure is to be increased, the three-way cock 26 is set into the position shown in Fig. 2. Then, liquid is fed through the duct 23, the cock 26 and the duct 27 into the cylinders 14 and 17. The volume and hence the length of the active mass of liquid comprised between the said pistons increases and since the piston 13 is prevented from being displaced towards the left, it is the piston 19 that is displaced towards the right, thus further compressing the gas in the cylinder 17. As a result, the said mass of liquid is subjected to an increased pressure and the pressure of contact between the roller 1 and the roll 8 is correspondingly increased.

When the pressure-indicator 29 shows that the contact pressure is sufficient, the cock 26 is further brought into the position shown in Fig. 1 and the conditions of said figure are re-established, except that the pressure of contact is now higher. It is to be noted that the cock 34 is then set in a position in which the left-hand space of the cylinder 14 communicates with the unloading duct 35, so that no counter pressure is exerted in the said cylinder space.

Conversely, if the pressure of contact is to be reduced, the three-way cock 26 is set into the position shown in Fig. 3, wherein the space containing the active mass of pressure liquid communicates through the duct 27 and the cock 26 with the unloading duct 32. The compressed gas in cylinder 17 expands and moves the piston 19 towards the left—in the drawing—so that a portion of the liquid of the said mass is expelled out. Once the pressure has been reduced to the desired value, the three-way cock 26 is reset into the position of Fig. 1. It is to be pointed out that during this whole pressure-reducing operation, the three-way cock 34 has been kept in the position of Fig. 1, to prevent any suction effect from occurring in the left-hand space of cylinder 14 and hindering the desired withdrawal of piston 13.

The above-described system further offers another facility consisting in that the roller 1 may be withdrawn at a quick rate by setting both cocks 26 and 34 in the positions shown in Fig. 4, wherein the cock 26 sets the space containing the active mass of liquid in communication with the unloading duct 32, while the cock 34 sets the left-hand space of the cylinder 14 in communication with the feeding duct 23. The pressure liquid discharged by the pump then pushes the piston 13 towards the right together with the roller 1, while liquid flows out into the tank 24 from the ducts 27 and 32. Meanwhile, the piston 19, under the action of the compressed gas is free to assume the position shown in Fig. 4 at the left-hand end of the cylinder 17. If the roller 1 is to be brought back into contact with the roll 8 from the position of Fig. 4, it suffices to reset the cocks 26 and 34 in their positions shown in Fig. 2, corresponding, as described above, to an increase of pressure. The piston 13 is then once more moved towards the left, together with the rod 12, the slide 4 and the roller 1, until the latter is brought into contact with the roll 8. Up to this time, all parts of the machine may be moved freely except for the normal resistances due to frictions, so that these displacements may be effected with a comparatively low pressure of the liquid insufficient to overcome the gas pressure in cylinder 17, so that the piston 19 remains, during this phase, in contact with its abutments in cylinder 17. However, from the moment when the roller 1 enters into contact with the roll 8, the piston 13 is made stationary and the pressure liquid further introduced into the passage 16 begins to push the piston 19 back towards the right, thus further compressing the gas in the cylinder 17. As a result, the pressure of said gas which is transmitted through the liquid to the piston 13 and, hence, to the roller 1, is increased. Thus, the conditions corresponding to Fig. 1 are reassumed.

In the embodiment shown in Fig. 5, there are shown as previously at 1 a roller, at 4 a slide supporting said roller, at 5 and 6 sliding bars for said slide, at 12 the rod of a piston 13 mounted in a cylinder 14, all these parts being designed and operating in the same manner as in the above described embodiment. Also, as previously, the elastic means are constituted by a compressed gas cushion contained in a cylinder 17 provided with a free piston 19 and thus constituting a hydraulic-pneumatic accumulator. In this embodiment, there is interposed between the cylinders 14 and 17, another cylinder 40, the left-hand compartment of which communicates in parallel through a duct 41 with the right-hand compartment of the cylinder 14 and with a three-way cock 42.

The said left-hand compartment also communicates through a duct 43 with the "liquid" compartment 20 of the accumulator 17. In the cylinder 40 is slidably mounted a free piston 44. In the drawing, the said piston is shown in its left-hand terminal position, wherein a projection 45 bears against the head of the cylinder 40, while the piston 44 lifts a valve 46 off its seat against the action of a spring 47. In the said position of the piston 44, the above-described active mass of pressure liquid is interposed between the gas cushion in cylinder 17 and the roller 1. The displacements of the piston 44 are controlled by a three-way cock 48 which permits selectively either admitting a pressure liquid through a duct 51 into the right-hand compartment 52 of the cylinder 40 or to interconnect the said compartment with an unloading duct 49 leading to the tank 24. The pressure liquid is fed by a pump 22 from the tank 24. When both three-way cocks 42—48 are closed, the pump discharges into an unloading valve 28 limiting the pressure to a predetermined required value and sending the excess liquid back into the tank 24. The three-way cock 42 permits interconnecting the duct 41 either with the outlet duct 25 of the pump 22 or with the unloading duct 49'. In the position of the cock 42 shown in Fig. 5, the duct 41 is interrupted, so that the active liquid mass remains constant, the pressure thus transmitted being displayed on the pressure-indicator 29. Now, if the cock 42 is set into its position wherein the outlet duct 25 of the pump 22 communicates with the duct 41, the pump 22 will discharge into the said duct 41, thus increasing the volume of the active mass of liquid, so that the same being incompressible for all practical purposes will push the piston 19 downwardly (in the drawing), thus increasing the pressure transmitted through the said mass of liquid. Conversely, if the cock 42 is set into its position, wherein the duct 41 communicates with the unloading duct 49', a portion of the active mass of liquid will escape to the tank 24, under the action of the compressed gas cushion on piston 19, so that the pressure transmitted to the mass of liquid and hence to the roller 1 will be reduced. Thus, it may be seen that by simply actuating the three-way cock 42, it is possible to adjust the volume of the mass of liquid and hence the pressure of contact of the roller 1, substantially in the same manner as in the embodiment shown in Figs. 1 to 4. Furthermore in the embodiment of Fig. 5, a momentaneous suppression of the pressure of contact may be obtained as follows: The three-way cock 48 is actuated to establish a communication between the duct 51 and the unloading duct 49. The liquid contained in the cylinder 40 and the said duct 51 is then free to escape under the action of the above-described active mass of liquid.

This causes a displacement of the free piston 44 towards the right (in the drawing). As a result, the valve 46 is released and closed under the action of its spring 47, so that the portion of the active mass of liquid contained in the duct 43, in the "liquid" compartment 20 of the accumulator 17, and in the valve 46 is entrapped, the pressure exerted by the pressure gas on the piston 19 being maintained. The withdrawal of the piston 44 permits a free displacement of the remaining portion of the active mass of liquid, thus permitting a free withdrawal of the roller 1 e. g. to accommodate a seam of a fabric treated by means of said roller. As soon as the conditions which had required this withdrawal of the roller 1 have disappeared, it suffices to set the three-way cock 48 in its position wherein the outlet duct 25 of the pump 22 communicates with the duct 51. The pump 22 then discharges into the right-hand compartment 52 of the cylinder 40 and pushes the piston 44 towards the left (in the drawing), which causes, within a very short time, re-opening of the valve 46 and re-establishment of the initial previous conditions under resetting of the piston 44 in its abutted position. The immediate resetting of the initial conditions is made possible by the fact that the whole above-described operation has been effected without any variation of the volume of the mass of liquid, a portion of which has been merely set aside into the cylinder 40 to be integrally recuperated, since the three-way cock 42 has remained closed during the said operation. The active mass of liquid thus resumes accurately its previous configuration, so that the pressure transmitted by the said mass also reassumes its previous value. In the drawing, the size of the cylinder 40 has been exaggerated to facilitate understanding. In practice, the said cylinder is far smaller and the displacement of the piston 44 only causes motion of comparatively small masses, so that it is possible to obtain an extremely quick response of the mechanism. Furthermore, the delay of re-establishment of the initial pressure of contact may be still reduced by providing in the circuit controlling the piston 44 a buffer accumulator 53, continuously fed from the pump 22 and capable of more rapidly furnishing the required control power.

It is to be understood that the invention is not limited to the example described and shown and that it may be affected with numerous modifications within the reach of those skilled in the art without departing from the spirit of the invention.

In particular, the piston 44 provided in the cylinder 40 could be substituted for by a diaphragm secured in a suitable casing and controlled by any mechanical or hydraulic mechanism. Similarly, the operation of the valve 46 of the embodiment of Fig. 5 could be controlled independently either by means of the same pressure liquid or by any other mechanical hydraulic or electrical device. Finally, it would be easily possible to obtain a completely automatic cycle of operations by providing suitable means for detecting the conditions requiring a momentaneous withdrawal of the movable member subjected to the loading action of the elastic means.

In the embodiments of Figs. 1 to 4, the control has been assumed to be effected by means of two three-way cocks 26 and 34, but it is obvious that any other suitable control device could be used as well for controlling and adjusting the flow of the working pressure liquid. It is particularly advantageous to use, for this purpose, the distributor described in the copending application, Serial No. 510,233 filed May 23, 1955 by the applicant for: "Selective Fluid-Distributing Device."

In the above description as well as in the appended claim, the expression "active length of the mass of liquid" means the length obtained by dividing the volume of said mass by its mean section (all sections being taken in planes containing the intersection of the planes of the active surfaces between which the said mass of liquid is interposed; it is clear that in the particular case when said surfaces are parallel, said sections are also parallel and constituted by the cross-sections of the liquid mass).

What is claimed is:

The combination with a reciprocable element, a source of pressure liquid, a hydro-pneumatic accumulator having a liquid pressure chamber and a gas pressure chamber, and a hydraulic cylinder connected to said liquid pressure chamber and having a pressure piston attached to said element, of means for conducting pressure liquid from said source to one side of said piston, means for conducting pressure liquid from said source to the other side of said piston, valve means for controlling the flow of pressure liquid from said source to both sides of said piston to thereby adjust the yielding pressure in said gas pressure chamber and the position to which said piston and consequently, said element is urged by said yielding pressure, a second cylinder having a partition slidable therein to divide said second cylinder into two cylinder spaces, one of which is connected to said source of pressure liquid and the other of which is connected to said one side of the pressure piston, conduit means interconnecting said liquid pressure chamber of the accumulator and said other cylinder space, a spring loaded check valve in said conduit means having a stem engageable by said partition whereby said check valve will be unseated by said partition upon movement thereof due to pressure liquid conducted into said one cylinder space, and further valve means for controlling the flow of pressure liquid from said source to or from said one cylinder space, the arrangement being such that when said valve means for controlling the flow of pressure liquid from said source to both sides of said piston are set to interrupt the supply of pressure liquid from said source to said one side of the pressure piston and said further valve means set to allow discharge of pressure liquid from said one cylinder space, the pressure liquid in said hydraulic cylinder at said one side of the pressure piston is permitted to escape into said other cylinder space to thereby move said partition to a position in which said check valve is free to close under the combined action of its spring and of the pressure in said liquid pressure chamber so as to relieve the pressure piston from said yielding pressure.

References Cited in the file of this patent

UNITED STATES PATENTS

| | | |
|---|---|---|
| 2,204,434 | Munson | June 11, 1940 |
| 2,691,339 | Edwards | Oct. 12, 1954 |

FOREIGN PATENTS

| | | |
|---|---|---|
| 1,101,472 | France | Apr. 20, 1955 |